US006508461B1

(12) United States Patent
Trevorrow et al.

(10) Patent No.: US 6,508,461 B1
(45) Date of Patent: Jan. 21, 2003

(54) METHOD AND APPARATUS FOR SPRING TENSIONING

(75) Inventors: Thomas P Trevorrow, Holsopple, PA (US); Ben D. Yoder, Apple Creek, OH (US); Albert E Zuccolotto, Johnstown, PA (US); Thomas P Trevorrow, Jr., Holsopple, PA (US)

(73) Assignee: Safe Ratch, Inc., Johnstown, PA (US)

( * ) Notice: Subject to any disclaimer, the term of this patent is extended or adjusted under 35 U.S.C. 154(b) by 0 days.

(21) Appl. No.: 09/005,516

(22) Filed: Jan. 12, 1998

Related U.S. Application Data

(62) Division of application No. 07/540,839, filed on Jun. 20, 1990, now Pat. No. 5,911,797.

(51) Int. Cl.[7] .................................................. F16F 1/06

(52) U.S. Cl. ........................ 267/155; 267/179; 267/175; 16/299; 160/191

(58) Field of Search ................................ 160/191, 192, 160/318; 185/39, 44, 45; 16/79, 198, 299, 300, 308, DIG. 7, DIG. 10; 267/179, 180, 154, 155, 174, 175

(56) References Cited

U.S. PATENT DOCUMENTS

| | | | | |
|---|---|---|---|---|
| 1,994,142 A | * | 3/1935 | Madsen | 160/190 |
| 2,257,484 A | * | 9/1941 | Rowe | 160/191 |
| 2,786,231 A | * | 3/1957 | Robinson | 160/191 |
| 3,230,783 A | * | 1/1966 | Anderson | 74/54 |
| 3,651,719 A | * | 3/1972 | Wessel | 81/63.2 |
| 3,779,537 A | * | 12/1973 | Kalister | 267/179 |
| 3,921,761 A | * | 11/1975 | Votroubek et al. | 160/191 |
| 4,817,927 A | * | 4/1989 | Martin | 267/179 |
| 4,981,165 A | * | 1/1991 | Miller et al. | 160/191 |
| 5,911,797 A | * | 6/1999 | Trevorrow et al. | 81/176.1 |

* cited by examiner

*Primary Examiner*—Jack Lavinder
*Assistant Examiner*—Robert A. Siconolfi
(74) *Attorney, Agent, or Firm*—Dwight G. Diehl

(57) ABSTRACT

Disclosed herein is an improved arrangement for the operation of an overhead garage door that comprises an adapter utilized for installation and periodic maintenance of the support arrangement. Also disclosed is an adapter for use with existing garage door structures, improved wrenches for use in tensioning coil springs usually found in such arrangements and a method for tensioning such coil springs when they are originally installed or during periodic maintenance of the springs. The adapter comprises a body that may be mounted upon a rotatable shaft that supports the coil springs and be non-rotatabley attached to an end of the coil spring and the rotatable shaft. The attachment to the shaft is a releasable connection and the body has splines or projecting abutment surfaces so that two of the improved wrenches according to the present invention may have their jaws closely surround and engage the splines on the body. For already existing structures the adapter has an end that is designed to attach to the collar already in place and also be attached to the end of the coil spring. The wrenches have releasable latch means that are designed to engage and disengage with the splines on the adapter body. The method according to the present invention comprises engaging and rotating the splines with the wrenches in an alternate manner such that the coil spring is wound to make the tension greater or less as one desires.

3 Claims, 5 Drawing Sheets

METHOD AND APPARATUS FOR SPRING TENSIONING

This is a division, of application Ser. No. 07/540,839, filed Jun. 20, 1990 now U.S. Pat. No. 5,911,797.

BACKGROUND OF THE INVENTION

This invention has to do with a method and apparatus for tensioning coiled springs that are usually mounted upon a central shaft and is specifically directed to a coiled spring that is mounted on a fixed shaft and used in providing the proper counterbalancing tension for use with overhead garage door openers.

The installation of overhead garage doors usually involves installing railings that support each side of the door and upon which the sides of the door are freely slideable. The railings usually have three sections which comprise an upper section in an horizontal position for storing the door in an open position, a vertical section for holding the door in a closed position, and a curved section for transition of the sides of the door from the horizontal rails to the vertical rails. As most garage doors are too heavy for a normal person to lift some sort of counterbalancing mechanism is usually provided so that the full weight of the door is not encountered when the door is transferred to the vertical sections of the railings when one closes the garage door. Even with power operated door opener devices a counter balance mechanism is provided so as to be able to reduce the horsepower requirements of the drive motor. For safety reasons the counter balancing mechanisms are also necessary in the event of failure of the garage door openers.

A prevailing type of counterbalancing mechanism in wide use with such overhead garage door openers, especially ones that have power operated motors to assist the opening and closing of the doors, is a coiled spring mounted upon a rotatable shaft. The shaft is usually located above the opening that is to be covered by the door and is transversely located across the path of the door. Upon this shaft is mounted a coiled spring in a somewhat concentric manner such that the longitudinal centerline of the spring approximately locates upon the longitudinal centerline of the shaft. One end of the spring is fixedly attached to a structure upon which the shaft is rotatably mounted and the other end of the spring is held releasably attached to the rotatable shaft. A cable arrangement is usually attached to the rotatable shaft in such a manner that it may be wound and unwound from the shaft. The other end of the cable is usually attached to the lowermost end of the door. Raising the door is supposed to cause the cable to wind around the shaft and lowering the door is supposed to cause the cable to unwind from the shaft.

The tensioning for the garage door takes the form of adjusting the tension exerted by the coiled spring upon the rotatable shaft that also holds the wound cable. When properly adjusted the tension exerted by the spring is supposed to just about counterbalance the weight of the door that is being transferred from the vertical section to the horizontal section of the railings. This is accomplished because, as the door travels downward the cable turns the rotatable shaft and in doing so winds the coiled spring mounted upon the shaft into a tighter configuration thereby producing an even greater upward counterbalancing effect on the weight of the door.

In original installation of the doors, when replacing broken springs, and even during periodic maintaince, it is necessary to adjust the tension of the coil springs to the desired degree so that the door can close and counterbalance almost the entire weight of the door during the raising and lowering of the door. To adjust the tension of the coiled spring it is necessary for one to loosen the releasably fixed end of the coil spring that is attached to the rotatable shaft and rotate the end of the spring relative to the shaft, either in a manner to lessen the tension or to tighten the tension. The coiled springs used in such installations are not insubstantial in the force and/or torque that they exert to accomplish their task and it is therefore considered by those skilled in the art a potentially dangerous operation. When the one end of the spring attached to the rotatable shaft is loosened it must be securely held so as not to freely uncoil back to a tension free state. Such an uncoiling while a workman or other person is in the area has produced some very severe injuries.

Recognition of the problem and attempts at solving the problem are illustrated by the U.S. Pat. No. 4,253,350 granted to De Tarr.

OBJECTS OF THE INVENTION

It is an object of the present invention to provide a safe and efficient method for the tensioning of coiled springs used in overhead garage door installations.

It is an object of the present invention to provide an improved tool for use in properly tensioning coiled springs used in overhead garage door installations.

It is an object of the present invention to provide a new attachment for coil springs that will ease the operation of adjusting the tension of coiled springs in overhead garage door installations.

It is an object of the present invention to provide a set of tools for use in adjusting the tension in overhead garage door supports.

BRIEF SUMMARY OF THE INVENTION

According to the present invention there is disclosed an overhead garage door support arrangement which comprises a fixed support structure usually in the form of structural trusses placed on the walls or suspended from a ceiling of a garage. The support structure has thereon the railings and other mechanisms necessary for the operation of a garage door and specifically supports an elongate rotatable shaft usually mounted transverse to the travel of the door. An elongate coil spring having opposing ends and coils surrounds the shaft, with one of the opposing ends of the coil spring non-rotatably attached to the support structure, usually one of the side walls of the garage.

The present invention has to do with a collar rotatably mounted upon the shaft, the collar having a first means thereon for non-rotatable attachment to the opposite end of the coil spring attached to the wall. The collar is also provided with a second means for releasably holding the collar non-rotatable with the shaft. Extending from the collar or integrally on the collar is a boss means having longitudinally extending and outwardly projecting abutment surfaces formed thereon, with said projecting abutment surfaces having a greater longitudinal dimension than outward extending dimension. Preferably the boss will comprise a cylindrical, externally splined, rod section.

Preferably the first means on the collar comprises a frustro conical section with its base joining the collar and an abutment surface formed at such junction. Grooves are provided circumferential in a threadlike manner on the external part of the conical section to threadedly engage the radially inner surfaces of the coils and hold the end of the spring non-rotatably (in one direction) against the abutment surface. The grooves, abutment surface, and coils then comprise co-operating elements of threaded abutment means between the collar and the coils on one end of the spring. The collar is also provided with the ability (second means) to be releasably held non-rotatable with the shaft. The second means on the collar comprises threaded perforations extending from the outer diameter of the collar to the internal diameter that engages the shaft, and set-screws rotatably mounted in the perforations that may be advanced against the shaft to firmly hold the collar and shaft non-rotatable with one another. Preferably the collar is formed so that the first means and the boss means are separated by an intermediate section, with the intermediate section having a larger diameter than either of the first means and the boss means, and the intermediate section having the threaded perforations formed therein.

In addition to the other features formed on the collar of the present invention blind holes are also formed radially inwardly on the intermediate section of the collar.

The present invention further contemplates a collar and boss attachment mechanism for over head garage door support arrangements which comprises a collar rotatably mounted upon a cylindrical shaft, with a first means on the collar for fixed attachment to one end of the coiled spring mounted on the shaft and a second releasable means for holding the collar non-rotatable with respect to the shaft. Extending from or mounted integrally on the collar is a boss having longitudinally extending grooves formed on the outer periphery of the boss, with the grooves having a greater longitudinal extending dimension than the corresponding radially inward extending dimensions. The boss preferably takes the form of a cylindrical, externally splined, rod section.

Preferably the collar and boss attachment mechanism according to the present invention will have a first means comprising co-operating elements of threaded abutment connection between the collar and the coils on one end of the spring. Preferably the co-operating elements of threaded abutment means between the collar and the coils on one end of the spring comprise a circumferential threaded frustro-conical portion for engagement internally of the coils of the spring, and a longitudinally facing abutment surface at the base of the frustro-conical section engaging the end of the spring.

Preferably the collar and boss attachment mechanism according to the present invention will have a second means comprising radially extending threaded perforations, and set screws mounted in said perforations and operable to clamp said collar non-rotatably with said shaft. Preferably the first means and the boss are separated by an intermediate section, with the intermediate section having a larger diameter than either of the first means and the boss, and the intermediate section having the second means formed therein. And further the collar and boss attachment mechanism according to the present invention will comprises blind holes formed radially inwardly on the intermediate section. Such blind holes will have both circular and hexagonal configurations when viewed from above.

The present invention also contemplates an adapter and boss attachment mechanism for tensioning coiled spring assemblies already in place. Such attachments comprises an adapter for rotatable mounting upon a cylindrical shaft, with a first means on the adapter for releasable attachment to a collar attached to one end of a coiled spring mounted on the shaft, and a boss on the collar with the boss having longitudinally extending grooves formed on the outer periphery of the boss with the grooves having a greater longitudinal extending dimension than the corresponding radially inward extending dimensions. Preferably the boss will comprise two symmetrized sections with a hinge means joining said sections along their symmetrical centerline, so that the boss has a closed position in which it is rotatably mounted upon the shaft and an open position in which it may be removed from or positioned around the shaft. And even more preferably either one or both the adapter and boss of the adapter and boss attachment mechanism will comprise two symmetrized sections with a hinge joining the sections along their symmetrical centerline so that the adapter and boss have a closed position in which the adapter engages the collar and the boss means engages the shaft, and an open position in which the adapter may be removed from or positioned on the collar and the boss may be removed from or positioned on the collar, and means for holding the sections in a closed relationship.

The present invention further contemplates a wrench assembly which comprises an elongate handle and an open ended jaw formation, located on one end of the handle, for closely surrounding and engaging a majority of the perimeter of a cylindrical shaft. Located in the handle is a spring loaded latch mechanism moveable latch that, in a first position, protrudes into the jaw engagement area and, in a second position is retracted from the jaw engagement area. Provided on the wrench is a means for moving the latch from either one of the first position or second positions to the other of the positions. The means for moving the latch can take the form of a lever pivotally mounted on the handle but most preferably the means for moving the latch will take the form of co-operating elements of a rod and cam assembly, where the rod extends through the interior of the handle and engages a cam mechanism, so that rotation of the cam mechanism operates the latch from one of its first or second positions to the other position.

The present invention also contemplates a method of winding a coil spring which is mounted upon a rotatable shaft. This method comprises the steps of rotatably mounting upon the shaft a body having an internal hollow cylindrical configuration and providing external splines on the body. Next the body is attached non-rotatably to the end of the spring that is releasably attached to the shaft, and two wrenches according to the present invention are engaged over the splines. One of the wrenches is then activated to engage the splines so as to hold the body against movement. The end of the spring is then released from attachment with the shaft. The engaged wrench is then moved so as to rotate the body and the end of the spring in the direction desired. The engaged wrench is then again held against movement while the other wrench is positioned to provide further rotation to said body and spring and then activated to engage the splines on the body. While holding the engaged wrench against movement the first wrench is dis-engaged from the spline and the engaged wrench is then moved so as to rotate the body and the end of the spring in the direction desired. This procedure is repeated until the desired tension has been achieved in the coil spring. The end of the coil spring is then re-attached and the wrenches are removed from the spline area.

Preferably the material for the boss means and the collar is comprised of a stainless steel material and most preferably a iron-chromium corrosion resistantant stainless specified as type CA-15 by the Steel Founders Society of America and by the Alloy Casting Institute. The material is appropriately heat treated after machining to obtain the maximum hardness.

DETAILED DESCRIPTION OF THE DRAWINGS

Figure 1:
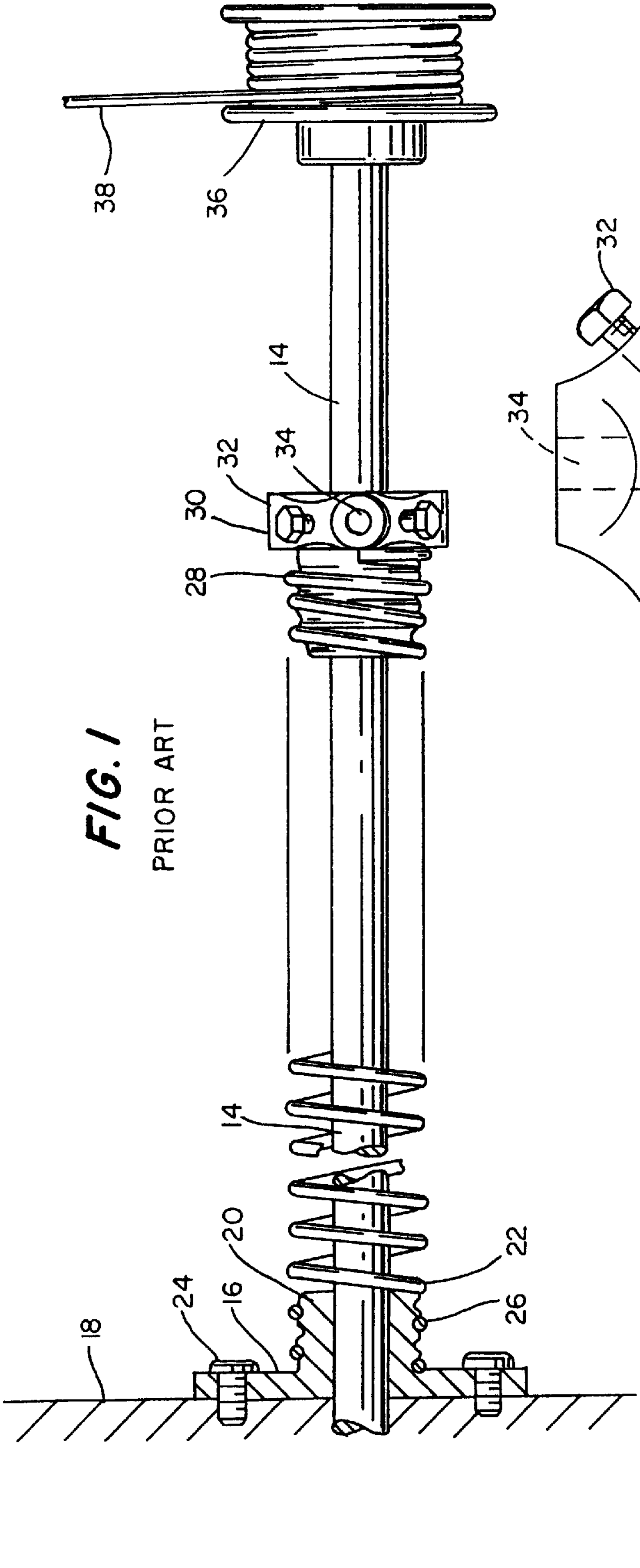
FIG. 1 PRIOR ART
FIG. 1 is a view of a support arrangement according to the prior art.

What is shown in FIG. 1 is a typical garage door spring rod installation with a rotatable supported rod 14 shown extending through a fixed collar member 16 shown attached to the wall or support structure 18. The collar 16 has means 20 thereon for engaging an end of the coil spring 22 which is concentrically wound so that the longitude center line of the coil spring 22 will be substantially congruent with the longitude center line of the rotatable rod 14. Fasteners 24 hold the collar member 16 non-rotatable with the wall structure 18 and end 26 of spring 22 is fitted over the end 20 of the collar member 16 so as to hold the end 26 of coil spring 22 from rotating. An opposite end 28 of the coil spring 22 is shown attached to a rotatable collar 30. The rotatable collar 30 has a central aperture therethrough so that it may be mounted in a releasablely fixed manner upon the rod 14. The rotatable collar 30 will have set screws 32 that may be positioned so as to engage the rod member 14 and hold the collar 30 non-rotatable with the rod 14. Blind holes 34 are provided in the rotatable collar 30 so as to aid in the adjustment of the coil spring 32 in the tension of the coil spring 22. Also shown in FIG. 1 is a cable reel 36 that is firmly attached to the rotatable rod 14 and is there to wind cable 38 around the cable reed 36 Cable 38 usually extends to a pulley system and has its distal end attached to some part of a garage door (not shown) of the entire assembly is designed to work in the following manner: as the garage door descends cable 38 is unwound from the cable reel 36, the cable reel 36 in turn rotates rod 14 which in turn rotates the collar 30 and the end 28 of the coil spring 22. Since the end 26 of the coil spring 22 is held in a fixed position, the rotation of the end 28 of coil spring 22, increases the resistance torque inherent in coil spring 22and therefore helps to counter balance the weight of the garage door as it descends into a vertical and closed position. Upon installation of the garage door mechanism, it is necessary that the end 28 of coil spring 22 be wound with respect to the end 26 of the coil spring 22. In order to achieve the correct counter balancing tension, set screws 32 in the rotatable collar 30, are loosened so that they do not engage the rod member 14, when all of the set screws 32 have been loosened in such a manner it is then possible to engage the blind holes 34 of the rotatable collar 30 and wind the collar 30 so as to place the end 28 of coil spring 22 in the correct tensioning position with respect to the end 26 of coil spring 22. When the coil spring 22 is in its free state there is no danger to personnel in the area of the spring mechanism. However, when the rotatable collar 30 has been wound so that the end 28 is in a tension position with respect to the end 26 a dangerous condition exists. At that point the collar 30 must be held firmly in position so that it will not suddenly uncoil.

Figure 2:
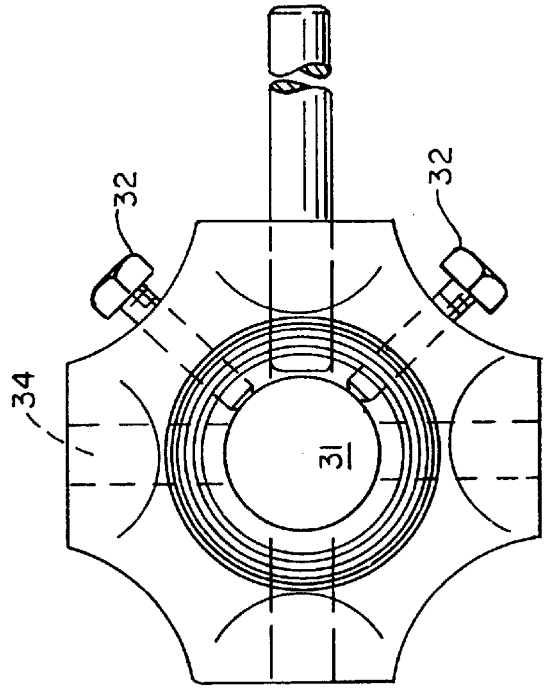
FIG. 2 PRIOR ART
FIG. 2 is a side view of a collar according to the prior art.

Shown in FIG. 2 is the rotatable collar 30 showing the set screws 32 therein and showing the central aperture 31 in the rotatable collar 30. Blind holes 34 are shown formed in the rotatable collar 30.

Figure 3:
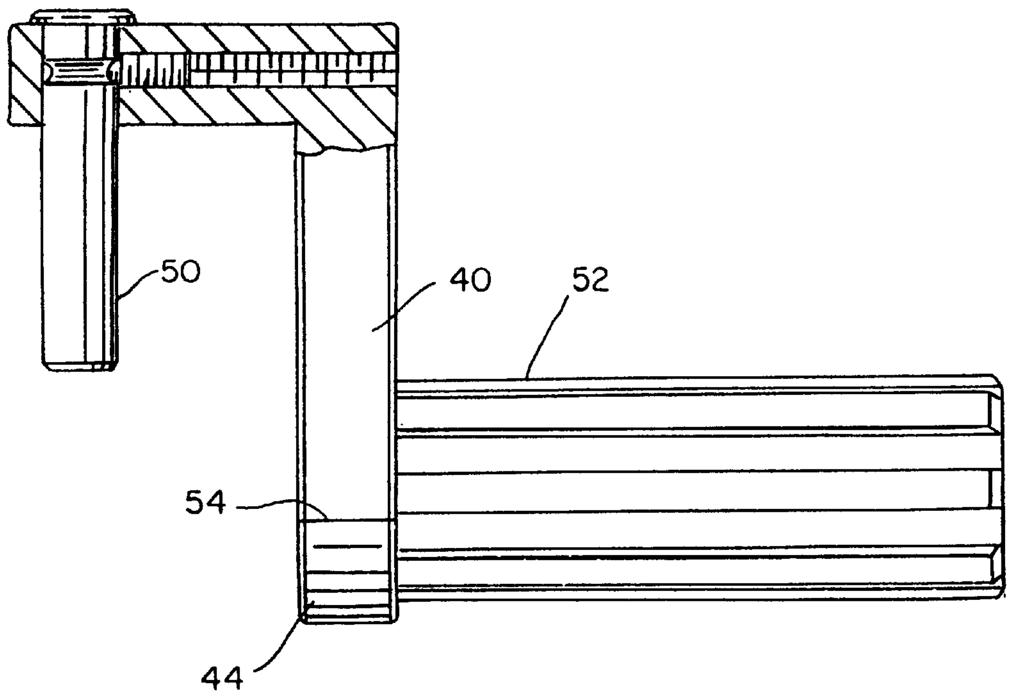
FIG. 3 is a collar adapter and spline arrangement according to the present invention.
Figure 3A:
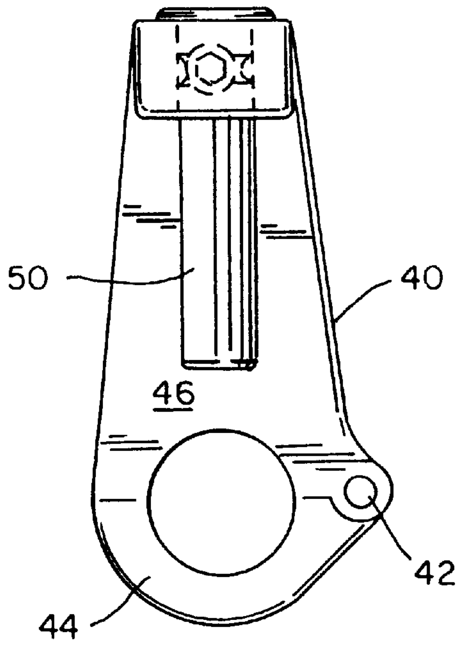
FIG. 3A is a left hand view of the collar arrangement shown in FIG. 3.
Figure 3B:
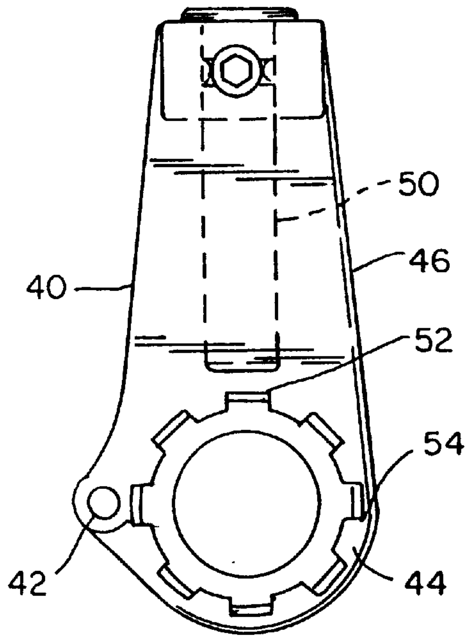
FIG. 3B is a right side view of the collar shown in FIG. 3.

Shown in FIG. 3 and 3A is an adapter mechanism 40 that has a hinged joint 42 that allows the arm 44 to swing away from the body 46 of the adapter 40. An aperture 48 is shown formed by the arm 44 and the body 46 of the adapter 40 with the aperture 48 sized so as to fit over the rod member 14 shown in FIG. 1. The adapter mechanism 40 has a pin member 50 that is sized so as to fit into the blind holes 34 of the rotatable collar 30. The adapter 40 further has a splined section 52 formed surround the central aperture 48 of the adapter 40. In this manner the adapter 40 may be utilized by first opening the arm 44 from the body 46 by pivoting arm 44 about pivot point 42. With the arm 44 in its opened position the adapter pin 50 may be slipped into a blind hole 34 of a rotatable collar 30 while the body 46 of adapter 40 rests over rod 14. When in such a position the arm 44 may then be swung about pivot point 42 so as to form a closure as is shown at 54 in FIG. 3A.

Figure 4:
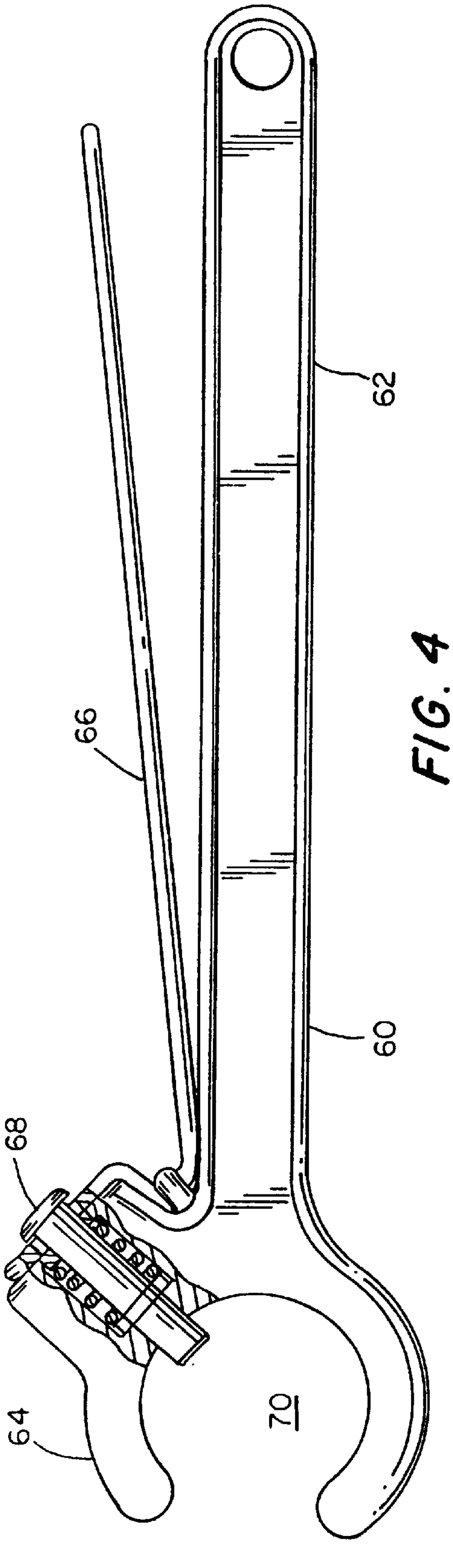
FIG. 4 is one embodiment of a wrench assembly according to the present invention.

Shown in FIG. 4 is a wrench 60 according to the present invention having a handle member 62 a circular engagement section 64 a long lever arm 66 and a plunger member 68. Wrench 60 is designed so that the circular area 70 within the engagement section 64 will form a close fit over the outer diameter of the spline section 52 of the adapter 40. When the lever arm 66 is pushed toward the handle member 62 the plunger member 68 is pulled upwardly so that the engaging button 72 is pulled out of the area 70 of the engagement section 64. In this manner the engagement section 64 may then be slid over the spline section 52 of adapter 40. A release of the lever member 66 allows the plunger member 68 to travel inwardly pushing the button 72 into the area 70 of the engagement section 64. The button 72 is designed to have a width so that it will be accepted between the upstanding splines on the spline section 52 of adapter 40. When the button 72 is engaged with the spline section 52 the exerting of a force on handle 62 of wrench 60 will exert a force through adapter 40 so as to tend to rotate the rotatable collar 30. As it will become more clear two wrenches 60 may engage the spline section 52 of the adapter collar 40. When two such wrenches 60 engage the adapter 40 the set screws 32 on the rotatable collar 30 may be loosened when the rotatable collar is loosened from its connection of the rod 14 wrenches 60 may be used to hold collar from rotating on the rod 14. While holding one wrench 60 that has its button 72 engaged with the splines of the adapter 40 the second wrench 60 may have the lever arms 66 activated so as to disengage its button 72 from the spline section 52 of adapter 40. With the first wrench 60 holding the adapter 40 and collar 30 non rotatable with the rod, the second wrench 60 may then be advanced rotational around the splined section 52 of the adapter 40. When the second wrench 60 is in a new position the lever 66 may be released so that its button 72 engages the spline section 52 of adapter 40. When the second wrench is in such a position and being held in such a position, the lever arm 66 of the first wrench 60 may be activated so that its button 72 is disengaged from the splines 52 of the adapter 40. The second wrench 60 may now be rotated back until its handle is in alignment with the first wrench. Repeating the above procedure with the first wrench and the second wrench will allow one to properly tension the two ends of the coil spring 22.

Figure 5:
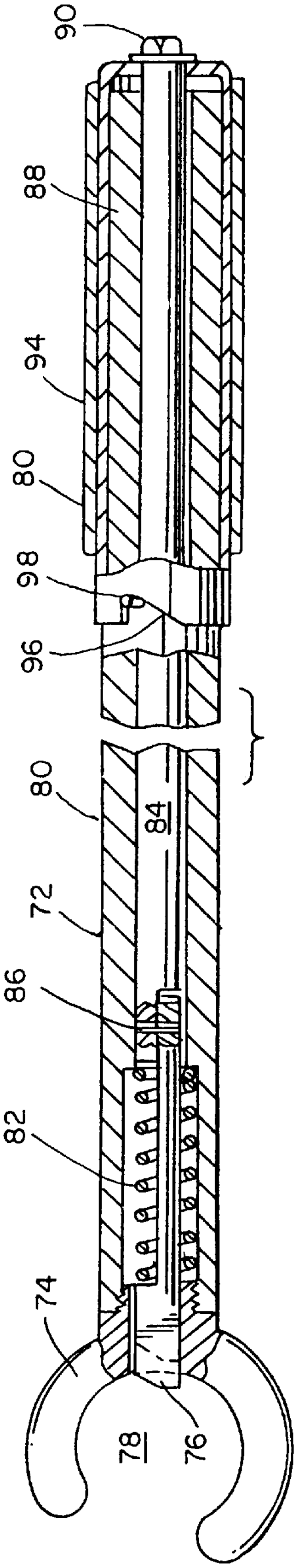
FIG. 5 is still another embodiment of a wrench assembly according to the present invention.

What is shown in FIG. 5 is another type of wrench 72 according to the present invention. The wrench 72 has jaws 74 that are designed to closely surround a spline boss means as shown in 52 in FIG. 3. A latch 76 is shown extending into the engagement area 78 of the jaws 74. The latch 76 is located internally of the handle 80 of the wrench 72 and has a spring 82 urging the latch member 76 into the engagement area 78. The latch 76 is shown connected to rod 84 by pin means 86. The rod 84 extends through the rear part 88 of handle 80. A fastener 90 attaches the rear part 92 of the rod member 84 to a knurled cam handle 94. The handle 94 is rotatable about the longitude axis of the handle 72 and has a cam surface shown at 96 that operates with the pin member 98. Rotation of the knurled handle 94 will cause the rod member 84 to retract towards the rear of the handle 72 and pull the latch 76 out of the engagement area 78. Rotation of the handle in the opposite direction will then allow the rod member 84 to advance toward the front of the wrench 72 so that the latch 76 will be urged into the engagement area 78 by spring means 82. In this manner the wrench shown in FIG. 5 may be engaged and disengaged with the splines and or abutment surfaces that are provided on the boss means of the collar.

Figure 6:
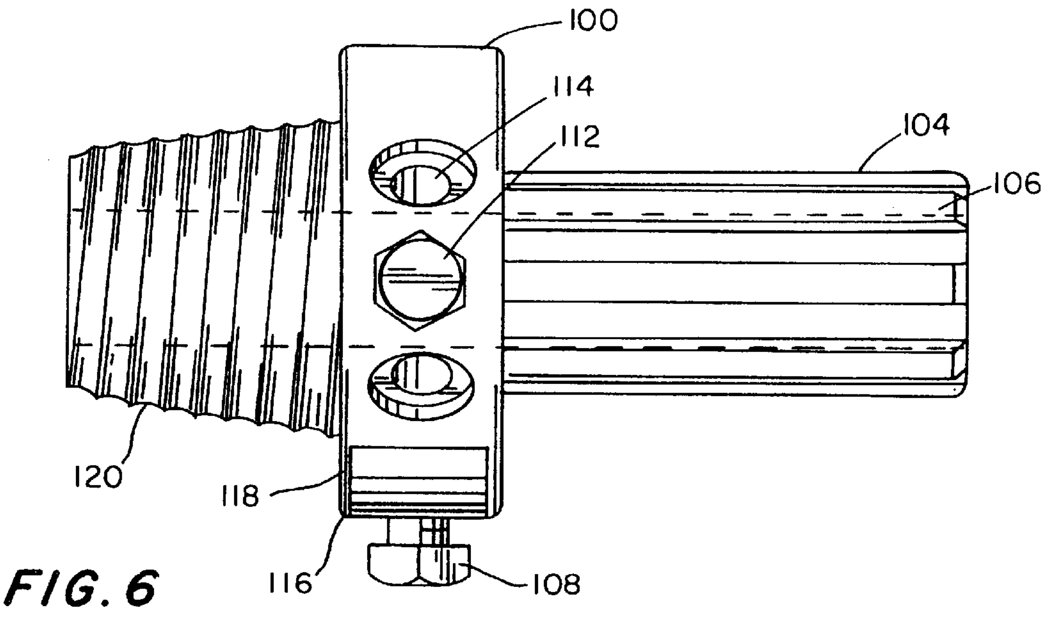
FIG. 6 is a collar and boss arrangement for use with garage door support arrangements according to the present invention.
Figure 6A:
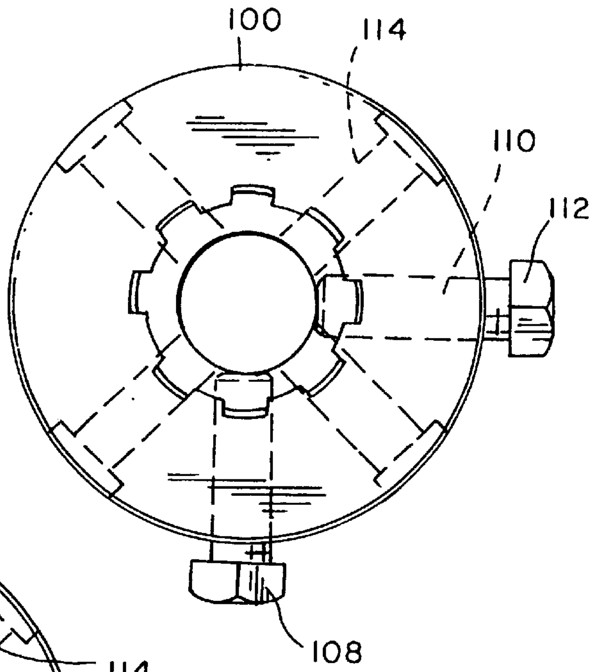
FIG. 6A is a right end view of the collar and boss arrangement shown in FIG. 6.
Figure 6B:
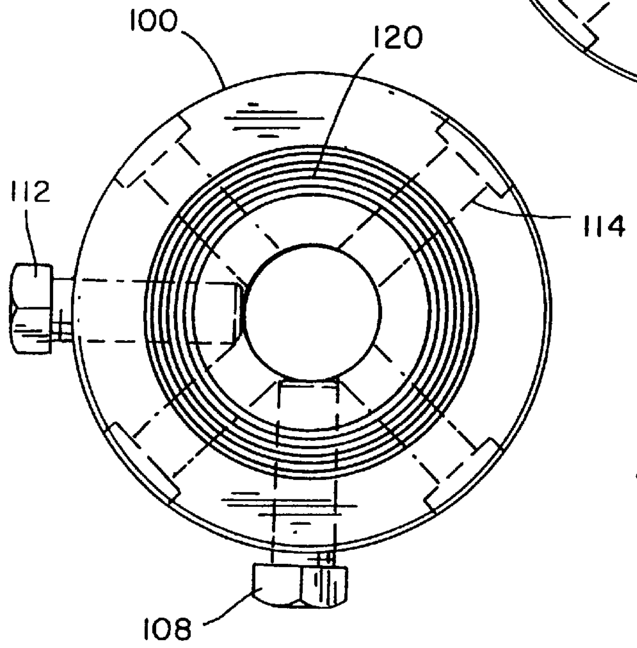
FIG. 6B is a left end view of the collar and boss shown in FIG. 6.

Shown in FIG. 6 is the collar 100 that is to be used as a permanent part of the garage door support assembly according to the present invention. The collar 100 has a first means thereon 102 for engaging one end of the coiled spring 22 shown in Figure land a boss means 104 having splines or projecting abutment surfaces 106 located thereon. The distinctive feature of the present invention is that the longitudinal dimensions of the projections 106 are greater than their radial dimensions. This is so that the wrenches according to the present invention may be placed on the boss means 104 and alternately moved to rotate the collar 100 when it is mounted upon the shaft 14 as shown in FIG. 1. The collar 100 has threaded set screws 108 that are mounted in perforations 110 shown in FIG. 6A. Rotation of the set screws 108 will advance the set screws into engagement of the shaft 14 so as to hold the collar 100 non-rotatable therewith.

Also shown in FIG. 6 are blind holes 112 and 114. Blind hole 112 is shown having a hexagonal fixation and blind holes 114 are shown having a cylindrical configuration.

First means 102 is shown having a frustro-conical with its base adjoining intermediate section 116 of the collar 100. The juncture of the base and the intermediate section 116 forms an abutment surface 118 that will abut the end of the coil spring when the first means 102 is attached thereto. The first means 102 also has thread-like groves 120 formed thereon so that they can mate with the internal surfaces of the coils of the spring. The first means 102 therefore can mate with the one end of the coil spring and hold it non-rotatably thereto.

Figure 7A:
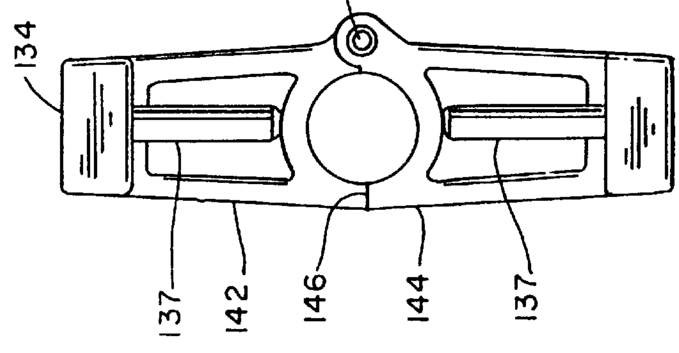
FIG. 7A is an end view of the adapter and boss arrangement shown in FIG. 7.
Figure 9:
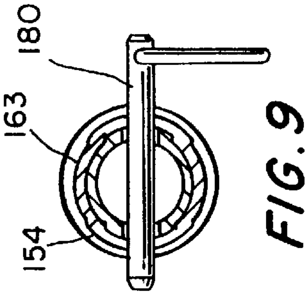
FIG. 9 is a view through section 9—9 of FIG. 8.
Figure 7:
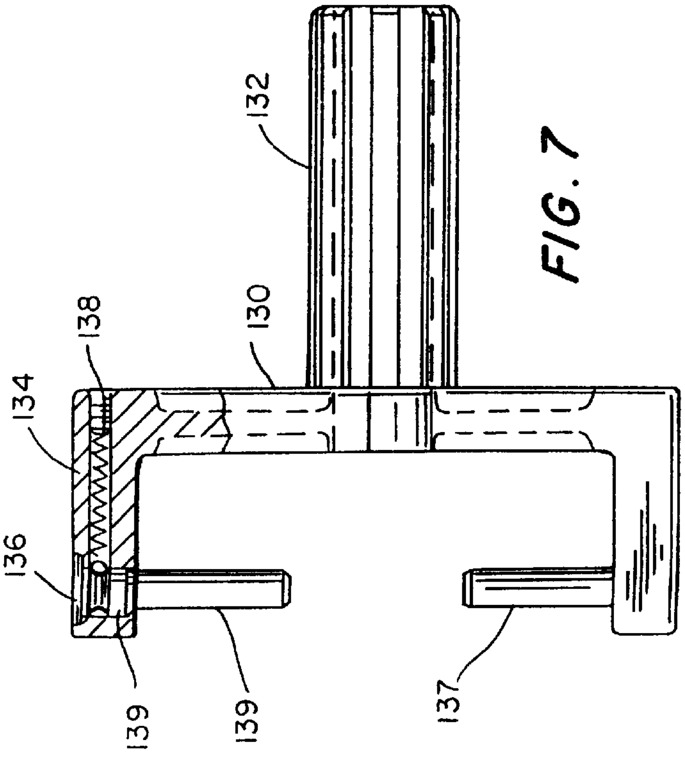
FIG. 7 is a side view of an adapter and boss arrangement according to the present invention.

What is shown in FIG. 7 is a collar adapter 130 having a spline section 132 that may be engaged with the wrenches according to the present invention and having an enlarged collar adapter section 134. In many of the present installations the coil spring has a collar that holds the end of the spring non-rotatable with the support shaft. The collar usually found at such installations has blind holes extending inwardly from its outermost diameter that may be engaged by pin members. The adapter 130 shown in FIG. 7 has the enlarged adapter section 134 designed so that it may be slipped over the collar and pins 136 may then be adjusted through set screws 138 so as to engage the collar member attached to the spring.

FIG. 7A shows an end view of the adapter 130 having a hinged joint 140 that allows the two symmetrical halves 142 and 144 to rotate and provide an opening as shown at 146. In this manner the adapter 130 may be placed over the rotatable support shaft around which the spring is located and then slid into alignment with the collar on the end of the spring so that the pins 136 may be engaged with the blind holds on the collar.

Figure 8:
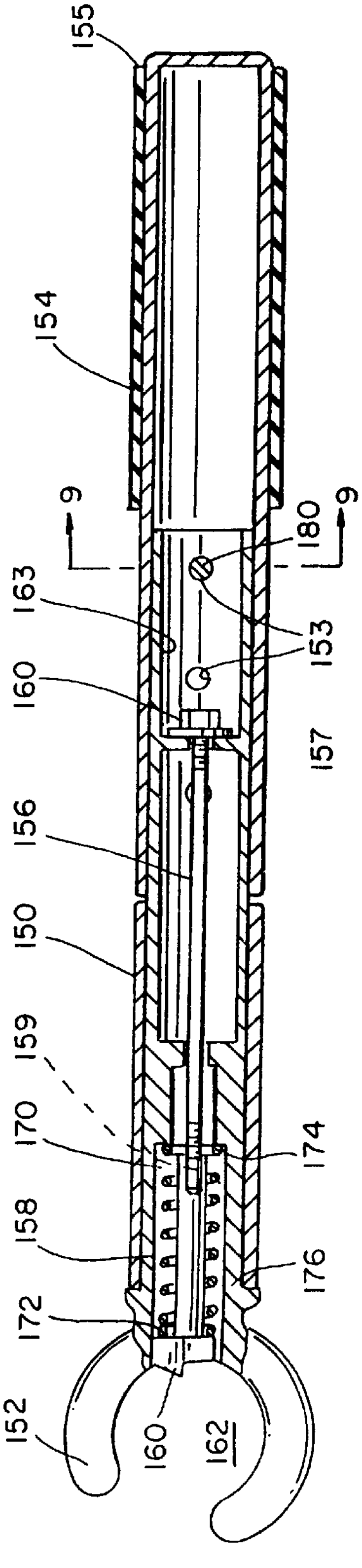
FIG. 8 is an alternate embodiment of an improved wrench according to the present invention.

What is shown in FIG. 8 is a preferred embodiment of an improved wrench according to the present invention. The wrench 150 is shown with an open ended jaw 152 and a handle 154. The handle 154 is preferably coated or enclosed with a rubber or plastic coating 155 for gripping purposes. Intermediate of the jaw 152 and the handle 154 is a rod 156 with opposing ends 157 and 159. End 157 is threadedly attached to a tee nut 160 which is abutted against tubular unit 163 that slides within tube 164. The other end 159 is attached to pawl member 160 at end 170 by being welded within a central opening in end 170. Spring 158 abuts between shoulder 172 on pawl member 160 and shoulder 174 within the body 176 of the forward end of the wrench 150. attached to tubular unit 163, and the spring 158, assembly that operates the position of the pawl 160 that projects into the area 162 of the jaw 152.

The pins shown at 130 and 136 are interchangeable by virtue of the co-operation between the groove and ball detent shown typically in FIG. 7. The preferred sizes for the diameter of the pins shown at 137 that are intended to locate in the collar are: 0.500 inch, 0.612 inch and 0.7500 inch: with all the pins having the same upper body configuration so as to fit into the arms of the adapters.

In a most preferrable mode a safety clamp is used to encircle and clamp to the splined sections (when they are engaged by the wrenches) in order to hold the wrenches on the sections during their operation.

Preferably the adapters and the heads of the wrenches are made from the stainless steel alloy as has already been specified and in addition the inside and outside of the tubular handles are phosphated in order to prevent scratching and rusting.

What is claimed is:

1. An adapter for tensioning coiled springs mounted upon rotatable shafts which comprises:

(a) a boss attachment means on said adapter with said boss attachment means having longitudinally extending groves formed on the outer periphery of said boss attachment means, said grooves having a greater longitudinal extending dimension than the corresponding radially inward extending dimension;

(b) said adapter rotatably mounted upon a cylindrical shaft, with a first means on said adapter for releasable attachment to a collar, with said collar attached to one end of a coiled spring mounted on said shaft;

(c) said first means comprises an arm positioned adjacent to said spring collar and a removable pin extending through said arm to engage the spring collar; and (d) said boss attachment means, said adapter, said collar and said spring are all concentric with said shaft.

2. The adapter and collar according to claim 1, in which said adapter comprises two symmetrized sections and a hinge means joining said sections along their symmetrical center line so that said adapter has a closed position in which it may be attached to said collar and an open position in which it may be removed from or positioned on said collar and means for holding said sections in said closed position.

3. The adapter and collar according to claim 1, in which said pin is held removably captive in said arm by a spring loaded detent.

* * * * *